(12) United States Patent
Nishimura

(10) Patent No.: US 12,384,249 B2
(45) Date of Patent: Aug. 12, 2025

(54) HIGH-VOLTAGE DEVICE AND SAFETY SYSTEM FOR HIGH-VOLTAGE DEVICE

(71) Applicant: TOYOTA JIDOSHA KABUSHIKI KAISHA, Toyota (JP)

(72) Inventor: Yoshihiro Nishimura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 18/178,679

(22) Filed: Mar. 6, 2023

(65) Prior Publication Data

US 2023/0391196 A1    Dec. 7, 2023

(30) Foreign Application Priority Data

Jun. 1, 2022 (JP) ................................. 2022-089820

(51) Int. Cl.
| | |
|---|---|
| H01M 50/00 | (2021.01) |
| A62C 3/16 | (2006.01) |
| B60K 1/04 | (2019.01) |
| B60L 3/00 | (2019.01) |
| H02M 7/48 | (2007.01) |
| H01M 50/242 | (2021.01) |

(52) U.S. Cl.
CPC ............... *B60L 3/003* (2013.01); *A62C 3/16* (2013.01); *B60K 1/04* (2013.01); *H02M 7/48* (2013.01); *H01M 50/242* (2021.01)

(58) Field of Classification Search
CPC . B60L 3/003; A62C 3/16; B60K 1/04; H02M 7/48; H01M 50/242
USPC .......................................................... 701/22
See application file for complete search history.

(56) References Cited

FOREIGN PATENT DOCUMENTS

| | | | |
|---|---|---|---|
| CN | 113745695 B | * | 10/2023 |
| JP | 2013-126809 A | | 6/2013 |
| JP | 2014-158508 A | | 9/2014 |
| JP | 2021-123184 A | | 8/2021 |

OTHER PUBLICATIONS

English translation for citation purposes (Year: 2021).*

* cited by examiner

*Primary Examiner* — Tiffany P Young
(74) *Attorney, Agent, or Firm* — Oliff PLC

(57) ABSTRACT

A high-voltage device used in a vehicle includes a high-voltage device body, a housing that houses the high-voltage device body, an ejection member, and a control device. The ejection member is configured to eject the insulating sealant into the housing in a mist or foam form with a gas flow. The control device is configured to activate the ejection member when a predetermined impact force on the vehicle is detected.

5 Claims, 2 Drawing Sheets

HIGH-VOLTAGE DEVICE AND SAFETY SYSTEM FOR HIGH-VOLTAGE DEVICE

CROSS-REFERENCE TO RELATED APPLICATION

This application claims priority to Japanese Patent Application No. 2022-089820 filed on Jun. 1, 2022, incorporated herein by reference in its entirety.

BACKGROUND

1. Technical Field

A technique disclosed in the present specification relates to, for example, a high-voltage device and a safety system for the high-voltage device.

2. Description of Related Art

For example, there is known a vehicle on which a drive motor, an inverter that supplies a current to the drive motor, and a battery are mounted, and that travels by using motor drive. A high-voltage device such as an inverter is housed in a suitable housing. The housing is mounted on a front portion or the like of the vehicle.

When the housing is damaged due to an impact applied to the front portion of the vehicle, a means for physically insulating wiring or the like inside the high-voltage device such as the inverter and suppressing an electric leakage may be provided. For example, a housing including a wall portion having a hollow portion filled with a liquid or a gel-like insulating sealant has been proposed (Japanese Unexamined Patent Application Publication No. 2013-126809 (JP 2013-126809 A)). The housing is configured to eject the insulating sealant from the wall portion toward the high-voltage device inside the housing by an increase in the internal pressure of the hollow portion when the housing is subjected to an external force.

SUMMARY

However, depending on the internal pressure generated in the hollow portion of the housing at the time of collision, even when the insulating sealant is entirely disposed inside the housing, it may be difficult to spread the insulating sealant to all corners of the inside of the housing. In this case, a part of the high-voltage device is exposed, and it is difficult to avoid a short circuit or an electric leakage in the damaged high-voltage device.

A technique disclosed in the present specification provides a technique capable of more reliably insulating the high-voltage device by effectively causing the insulating sealant to reach and adhere to the high-voltage device in the event of a collision or the like.

A high-voltage device according to a first aspect of the present disclosure is used in a vehicle. The high-voltage device includes:
 a high-voltage device body;
 a housing for housing the high-voltage device body;
 an ejection member for ejecting an insulating sealant inside the housing in a mist state or a foam state with a gas flow; and
 a control device for actuating the ejection member when a predetermined impact force on the vehicle is detected.

According to such a configuration, for example, when the impact force is applied on the vehicle, the ejection member ejects the insulating sealant inside the housing in the mist state or the foam state with the gas flow. Therefore, the insulating sealant can be effectively and widely spread inside the housing by the ejection member. In addition, the ejection member can effectively cause the insulating sealant to reach the high-voltage device. Therefore, it is possible to more reliably avoid or suppress a short circuit and an electric leakage caused by exposure and damage of the high-voltage device.

According to such a configuration, the ejection member ejects the insulating sealant into the housing in the mist state or the foam state with the gas flow. Therefore, a necessary amount of the insulating sealant can be prepared in advance. Therefore, it is possible to suppress an increase in the mass of the high-voltage device for the collision safety.

A safety system for a high-voltage device according to a second aspect of the present disclosure is used in a vehicle. The safety system for the high-voltage device includes:
 a high-voltage device body;
 a housing for housing the high-voltage device body;
 an ejection member for ejecting an insulating sealant inside the housing in a mist state or a foam state with a gas flow;
 an impact force detecting sensor for detecting an impact force on the vehicle; and
 a control device for actuating the ejection member when a predetermined impact force on the vehicle is detected.

According to such a configuration, for example, when the impact force is applied on the vehicle, the ejection member ejects the insulating sealant into the housing in the mist state or the foam state with the gas flow. Therefore, the insulating sealant can be effectively and widely spread inside the housing by the ejection member. As a result, in the high-voltage device, a short circuit or an electric leakage due to exposure or damage of a power conversion device body can be more reliably avoided or suppressed. In addition, since the ejection member ejects the insulating sealant into the housing in the mist state or the foam state, a necessary amount of the insulating sealant can be prepared in advance. Therefore, it is possible to suppress an increase in the mass of the high-voltage device for the collision safety.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the present disclosure, the insulating sealant contains the moisture-curable resin carrier. In this way, the insulating sealant quickly forms an insulating film or fills a damaged portion at a portion or the like attached to the inside of the housing. Therefore, the insulating sealant stably and reliably covers the main body of the power converter. Therefore, it is possible to effectively suppress or avoid the exposure of the power conversion apparatus main body, the short circuit, and the electric leakage.

In the embodiment of the present disclosure, the insulating sealant contains a flame retardant polyurethane as a resin component. When the flame retardant polyurethane adheres to the housing or the high-voltage device, it is possible to effectively suppress or avoid the combustion of the power conversion device main body or the other.

In the embodiment of the present disclosure, the ejection member is housed in a housing. In this way, since the filling body and the ejection member are protected by the housing, even if a predetermined impact force is detected with respect to the vehicle, a desired operation is ensured. Therefore, the ejection member can more reliably eject the insulating sealant into the housing.

In the embodiment of the present disclosure, the ejection member is provided so that the insulating sealant is ejected toward the upper surface of the inside of the housing. By doing so, the insulating sealant can be caused to collide with the upper surface of the inside of the housing, and scattered and diffused into the inside of the casing. As a result, the insulating sealant can be effectively spread widely inside the housing. This also suppresses the amount of the insulating sealant.

In the embodiment of the present disclosure, the ejection member comprises a gas generating and pumping device for generating and pumping gas. In this way, the insulating sealant is ejected into the housing with a high-pressure gas flow. Therefore, the insulating sealant can be more effectively and more reliably spread inside the housing, and the exposure of the high-voltage device can be effectively suppressed or avoided. In addition, the amount of the insulating sealant can also be suppressed.

In the embodiment of the present disclosure, the high-voltage device body includes an inverter. It may be useful to attempt collision safety for inverters.

These various embodiments are optionally combined in the power converter and safety system of the power converter disclosed herein. That is, these embodiments may be combined with one or more of the power converters or power converter safety systems disclosed herein.

Figure 1:
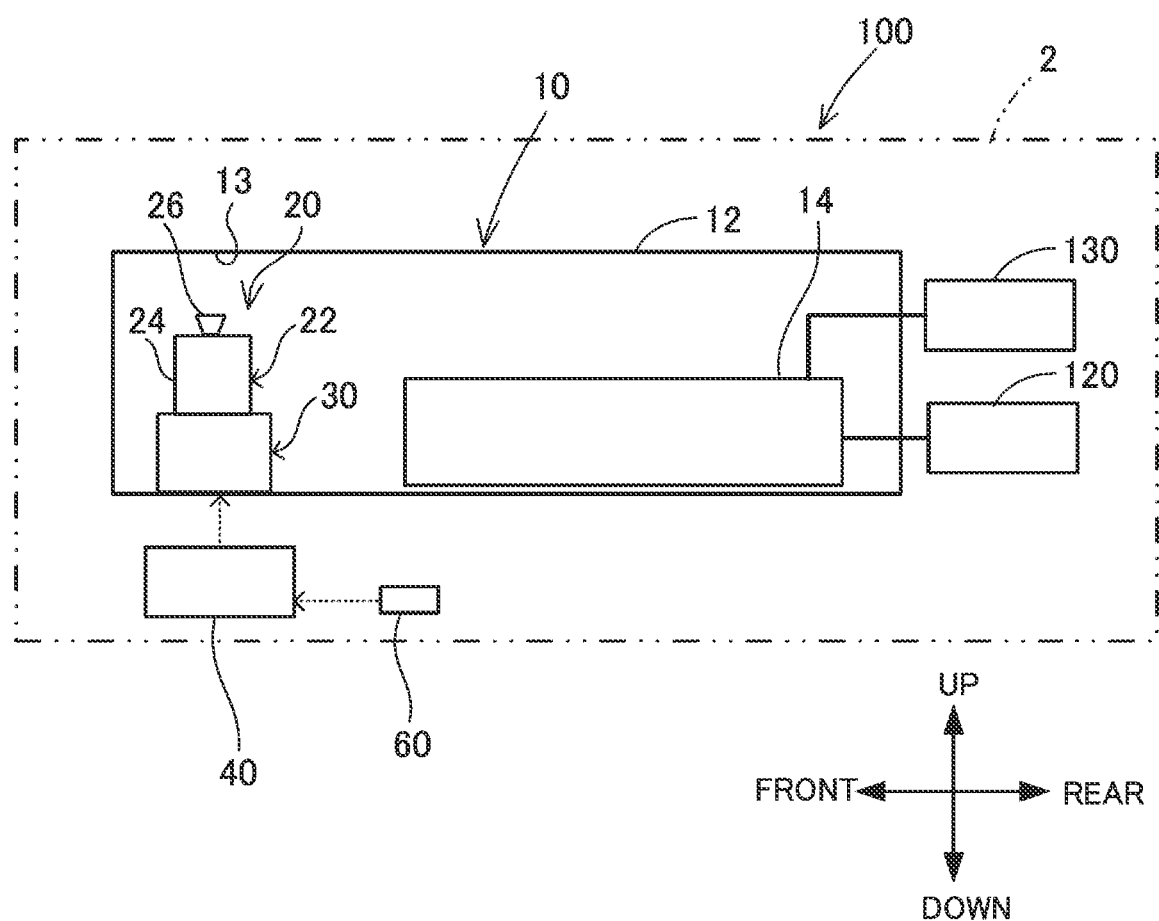
FIG. 1 is a diagram illustrating an example of a safety system of a high-voltage device including a high voltage device disclosed herein.
Figure 2:
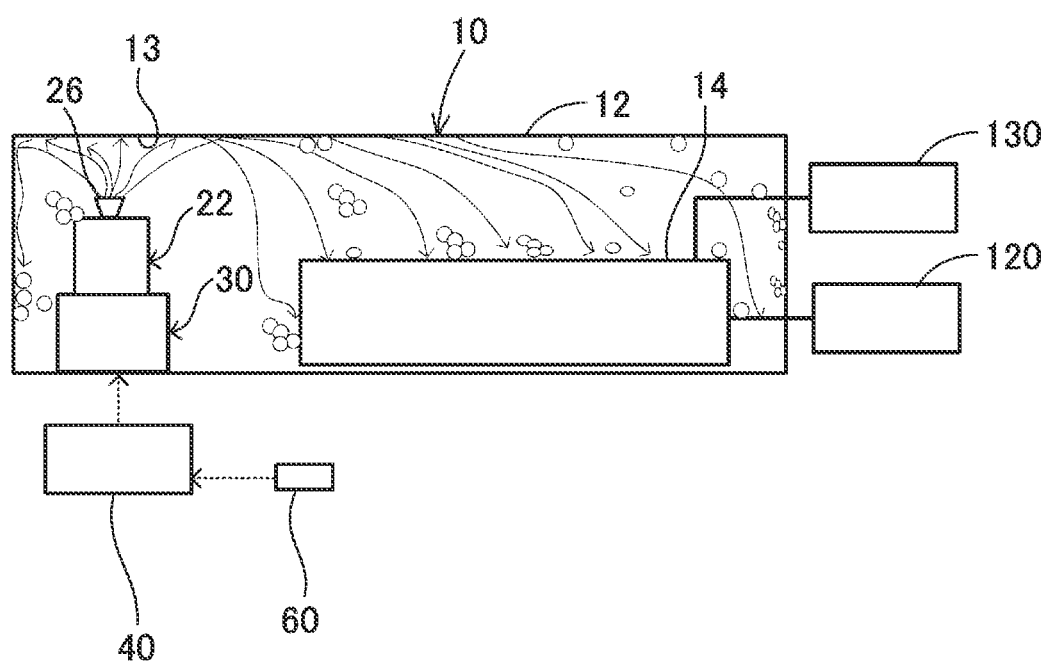
FIG. 2 is a view showing a state in which the insulating sealant is ejected into the housing by the operation of the ejection member in the high-voltage device shown in FIG. 1.
Figure 2:
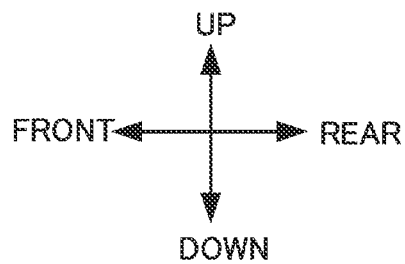

Hereinafter, a high-voltage device and a safety system for a high-voltage device of a vehicle disclosed in the present specification will be described with reference to the drawings as appropriate. FIG. 1 is a diagram illustrating an example of a safety system of a high-voltage device including a high-voltage device. FIG. 2 is a view showing a state in which the insulating sealant is ejected into the housing of the high-voltage device by the operation of the ejection member in the system shown in FIG. 1.

The high-voltage device is not particularly limited, and examples thereof include a power conversion device such as an inverter, a converter, and a cyclone converter, and a high-voltage relay device. The high-voltage device is, for example, for a vehicle. Examples of the vehicle include a vehicle that drives an axle using a motor. Examples include battery-powered battery electric vehicle (BEV), hybrid battery electric vehicle (HEV), plug-in hybrid battery electric vehicle (PHEV), fuel cell electric vehicle (FCV).

Safety System for High-Voltage Devices

The safety system 100 of the high-voltage device of the vehicle 2 shown in FIG. 1 includes a high-voltage device 10 and an Electric Control Unit (ECU) 40. In FIG. 1, UP indicates the vehicle upper side, DOWN indicates the vehicle lower side, FRONT indicates the vehicle front side, and REAR indicates the vehicle rear side. In the following description, the terms "upper" and "lower" and "front" and "rear" mean directions in the vehicle 2, respectively.

High-Voltage Device

The high-voltage device 10 includes a housing 12 and an inverter 14 housed in the housing 12. The housing 12 includes, for example, a case body and a cover. The housing 12 is formed by, for example, aluminum casting. Further, the housing 12 is configured so as to be able to ensure high airtightness while accommodating the inverter 14. The inverter 14 is an example of a high-voltage device body included in the high-voltage device disclosed in the present specification.

The inverter 14 is connected to a motor 120 external to the high-voltage device 10. The inverter 14 is connected to the battery 130 via a converter or the like outside the high-voltage device 10.

Insulating Sealant Injection Unit

Inside the housing 12, an injection unit 20 of an insulating sealant is provided. The injection unit 20 includes a filling body 22 in which an insulating sealant is filled in the container 24, and a gas generating pressure feeding device 30. The container 24, which is a part of the filling body 22, is made of metal or the like, and has a pressure-resistant structure capable of introducing gas from the gas generating pressure feeding device 30. The injection unit 20 is an example of an injection member included in the high-voltage device disclosed herein.

A nozzle 26 capable of injecting an insulating sealant in a mist or foam form by introducing gas from the gas generating pressure feeding device 30 is provided in a part of the container 24 on the upper side of the vehicle 2. The nozzle 26 includes an opening that opens upward in proximity to the upper surface 13 of the interior of the housing 12. The nozzle 26 is arranged such that the insulating sealant injected by the gas from the opening of the nozzle 26 collides with the upper surface 13, and thereafter the insulating sealant is scattered inside the housing 12.

The insulating sealant is an insulating liquid composition or a gel-like composition, and has fluidity and properties to the extent that it becomes atomized or foamed when sprayed. Spraying as a mist means that the insulating sealant is ejected as fine droplets, for example, when the insulating sealant collides with the inner surface of the housing 12 with a gas flow, the insulating sealant adheres to the collision surface, further insulating sealant to the extent that it is possible to scatter and diffuse from the collision surface, the insulating sealant is meant to be ejected as fine droplets. Further, the term "bubble-shaped ejection" means, for example, that the insulating sealant is a foam with bubbles, diffuses with a gas flow, and adheres to the inner surface of the housing 12 by colliding with the foam, and is ejected as a foam having a degree that can be scattered and diffused from the collision surface.

Unlike that the insulating sealant is simply discharged into the housing 12 as a liquid, a gel-like body, or a foam-like body, the insulating sealant is sprayed as a mist or a foam-like body, whereby the insulating sealant is diffused against gravity. Therefore, the insulating sealant is widely spread inside the housing 12. Further, even after the insulating sealant adheres to the adherend, it is difficult to drip against gravity.

Further, since the insulating sealant is ejected in this manner, the insulating sealant can be adhered and coated not only on the upper surface but also on the side surface of the inverter 14. Furthermore, the insulating sealant can be covered or filled, for example, in the damaged portion of the damaged inverter 14. Further, for example, an insulating sealant can be attached to and coated on the top, side, and bottom of the housing 12. Further, for example, the damaged portions at the upper portion, the side portion, and the bottom portion of the housing 12 can be covered or filled with the insulating sealant.

The composition that can be used as the insulating sealant is not particularly limited, and a known composition can be appropriately used. The insulating sealant may be an insulating resin composition. Such a resin composition can be used, for example, as a resin component, one or two or more selected from the group consisting of polyolefins such as polyurethane, polystyrene, polyethylene, or polypropylene, phenolic resins, polyvinyl chloride, urea resins, silicones, polyimides, and melamine resins can be used in combination. Among them, it is sometimes effective to use a flame-retardant polyurethane resin.

The resin composition containing these resin components may optionally contain a known curing agent and/or catalyst depending on the resin component. Examples of the curing agent and/or catalyst include, but are not limited to, a polyisocyanate, an organic acid, an inorganic acid, and an amine.

As the insulating sealant, it is sometimes effective to use a resin component that is cured (moisture-cured) by moisture in the air. This is because a coating film having excellent coating performance can be easily formed by the resin component. This is because such a resin component reaches the gap, so that the gap is filled. Examples of such a resin component include polyurethane and silicone resin. By using such a resin component, for example, in a case where the housing 12 is damaged, the resin component that has reached the damaged portion is hardened, thereby reliably covering the damaged portion, and thus can be filled.

In addition to the active ingredient such as a resin component as an insulating sealant, for example, a foaming agent, a foaming agent, and the like can be appropriately included in the insulating sealant to be ejected in a foam form.

The gas generating pressure feeding device 30 may be any device as long as it can feed the gas capable of spraying the insulating sealant in the form of a mist or a foam to the filling body 22. As the gas generated by the gas generating pressure feeding device 30, for example, a known insulating gas such as carbon dioxide or nitrogen can be used. Also, a flame retardant gas can be used.

The gas generating pressure feeding device 30 is not particularly limited, and examples thereof include, for example, an inflator that ignites a gas generating agent to generate gas, such as is used in an airbag for a vehicle, and a liquefied gas cylinder in which a cylinder with a valve is filled with a liquid that becomes a gas at atmospheric pressure, such as carbon dioxide. The gas generating pressure feeding device 30 is configured to be capable of pumping gas to the container 24 of the filling body 22.

A part of the vehicles 2 is provided with an ECU 40. ECU 40 includes a ROM for storing CPU, control programs, and the like, a RAM as an operation area of the programs, and the like, and interfaces for interfacing with peripheral circuits. ECU 40 controls each unit of the vehicle 2 and performs various controls such as traveling, braking, and charging and discharging by the motor 120 in the vehicle 2. ECU 40 is an exemplary control device in the high-voltage device disclosed herein.

For example, ECU 40 estimates the collision position and the magnitude of the impact force at the time of collision based on a signal from the acceleration sensor 60 or the like included in the vehicle 2. ECU 40 further determines whether or not the insulating sealant is to be ejected in the high-voltage device 10 based on such a signal, an estimation, or the like. Further, ECU 40 is configured to activate the gas generating pressure feeding device 30 of the injection unit 20 when it is determined that the insulating sealant is to be injected, to introduce the gas into the filling body 22, and to output a control signal for ejecting the insulating sealant. The acceleration sensor 60 is an example of an impact force detecting sensor included in the safety system of the high-voltage device disclosed in the present specification.

Next, the injection of the insulating sealant in the high-voltage device 10 will be described with reference to FIG. 2. Hereinafter, it will be described that the vehicle 2 collides with another vehicle or the like, ECU 40 determines to inject the insulating sealant based on a signal or the like from the acceleration sensor 60 or the like, and then outputs a control signal for injecting the insulating sealant to the injection unit 20 housed in the housing 12 of the high-voltage device 10. Further, as the insulating sealant, a composition containing a moisture-curable polyurethane, a foaming agent, a solvent, and the like will be described.

When the gas generating pressure feeding device 30 of the injection unit includes, for example, an inflator, the gas generating agent is ignited by the action of the ignition agent, and gas is generated at once, and the generated gas is pumped into the container 24 of the filling body 22.

As a result, as shown in FIG. 2, with the gas flow of the pumped gas, the insulating sealant filled in the container 24 is ejected from the opening of the nozzle 26 toward the upper surface 13 of the housing 12 in a foam shape. The insulating sealant containing the foam-like moisture-curable polyurethane that has collided with the upper surface 13 is scattered so as to descend from above in all directions, reaches the surface of the inverter 14 and the connection line with the outside housed in the housing 12, and adheres to the surface, and the curing is started. When the inverter 14 is damaged, the damaged portion is covered and filled, and curing is started. In addition, when the inner wall of the housing 12 or a damaged portion is generated in the housing 12 due to collision, the insulating sealant also reaches the damaged portion, covers or fills the portion, and curing is started.

Since the insulating sealant is ejected in the form of a foam with a gas flow, the insulating sealant is excellent in diffusibility itself, and further, the insulating sealant is ejected toward the upper side of the housing 12 so as to collide with and scatter the upper surface 13 of the housing 12, thereby further improving the diffusibility of the insulating sealant.

Further, since the insulating sealant is foam-like, even when it adheres to the upper surface or the upper wall surface of the inside of the housing 12, it adheres easily without flowing down downward, it is possible to cover the portion.

From the above, the insulating sealant reaches and adheres to and covers the upper surface, the side surface, and the like of the inverter 14 of the housing 12. In addition to the upper surface 13 of the housing 12, including the upper portion of the inner wall portion, the insulating sealant also reaches and covers the housing 12. Therefore, according to the high-voltage device 10, the inverter 14 and the housing 12, which are the high-voltage device body, can be effectively insulated regardless of the damaged form or the change in the arrangement state of the high-voltage device 10 caused by the collision.

In addition, since the insulating sealant contains a moisture-curable resin component and is cured by reacting with moisture in the atmosphere or moisture at the adhesion destination, the insulating sealant is generally cured within a few tens of seconds to a few minutes. The insulating sealant is rapidly cured at the adhered portion, and the adhered portion can be securely covered or filled, so that a more reliable insulation is possible.

In the above description, the insulating sealant has been described as being ejected in a foam form, but also in the embodiment of jetting as a mist, it is possible to exhibit the same scattering and diffusibility and adhesion and coating properties of the insulating sealant.

In the above description, the insulating sealant includes a moisture-curable resin component, but even if the insulating sealant is not a moisture-curable type, by spraying the insulating sealant in a foam form or in a mist form, it is possible to exhibit scattering properties and diffusibility as well as adhesiveness and coating properties.

In the above description, the insulating sealant is to be ejected toward the upper surface 13 inside the housing 12, but the present disclosure is not limited thereto, for example, it may be jetted toward the side wall and the inverter 14 inside the housing 12, collide and diffuse by scattering.

In the above description, the inflator is used as the gas generating pressure feeding device 30 in the injection unit 20, but the inflator may be a gas cylinder. The same operation and effect can also be obtained as an aerosol device in which the injection unit 20 itself ejects an insulating sealant as an aerosol.

In the above description, by providing the injection unit 20 inside the housing 12, the injection unit 20 can be protected by the housing 12, but the present disclosure is not limited thereto, and at least a part of the injection unit 20 may be provided outside the housing 12, and for example, a part including the nozzle 26 may be provided inside the housing 12.

Although the specific examples disclosed by the present disclosure have been described in detail above, these are merely examples and do not limit the scope of claims. The techniques described in the claims include various modifications and alternations of the specific examples illustrated above. The technical elements described in this specification or in the drawings may be used alone or in various combinations, and are not limited to the combinations described in the claims at the time of filing. The technology illustrated in the present specification or the drawings can achieve a plurality of objects at the same time, and has technical usefulness in achieving one of the objects.

What is claimed is:

1. A high-voltage device used in a vehicle, the high-voltage device comprising:
    a high-voltage device body;
    a housing, for housing the high-voltage device body, which houses:
        a nozzle configured to eject an insulating sealant with a gas flow inside the housing in a mist state or a foam state, the insulating sealant being ejected toward an upper surface in a vehicle height direction, the nozzle being provided on a lower surface inside the housing in the vehicle height direction and having an opening that opens upward in the vehicle height direction,
        an inflator configured to ignite a gas generating agent to generate the gas flow, and
        a container configured to be filled with the insulating sealant, the insulating sealant containing flame retardant polyurethane as a resin component; and
    a control device configured to actuate the nozzle when the control device detects that an impact force on the vehicle exceeds a threshold.

2. The high-voltage device according to claim 1, wherein the housing contains a moisture-curable resin component.

3. The high-voltage device according to claim 1, wherein the high-voltage device body includes an inverter.

4. The high-voltage device according to claim 1, wherein the insulating sealant contains a curing agent or a catalyst.

5. A safety system for a high-voltage device used in a vehicle, the safety system for the high-voltage device comprising:
    a high-voltage device body;
    a housing, for housing the high-voltage device body, which houses:
        a nozzle configured to eject an insulating sealant with a gas flow inside the housing in a mist state or a foam state, the insulating sealant being ejected toward an upper surface in a vehicle height direction, the nozzle being provided on a lower surface inside the housing in the vehicle height direction and having an opening that opens upward in the vehicle height direction,
        an inflator configured to ignite a gas generating agent to generate the gas flow, and
        a container configured to be filled with the insulating sealant, the insulating sealant containing flame retardant polyurethane as a resin component;
    an impact force detecting sensor configured to detect an impact force on the vehicle; and
    a control device configured to actuate the nozzle when the impact force detecting sensor detects that the impact force on the vehicle exceeds a threshold.

* * * * *